United States Patent [19]
Cutler et al.

[11] Patent Number: 5,622,807
[45] Date of Patent: Apr. 22, 1997

[54] PHOSPHOR FILM COMPOSITION FOR USE IN IMAGE CAPTURE

[75] Inventors: Gregory M. Cutler, Cupertino; Andreas Weber, Redwood City, both of Calif.

[73] Assignee: Hewlett-Packard Company, Palo Alto, Calif.

[21] Appl. No.: 338,922

[22] Filed: Nov. 14, 1994

[51] Int. Cl.$^6$ .................................................. G03C 1/725
[52] U.S. Cl. ..................... 430/139; 430/496; 430/944; 428/690; 250/330; 250/475.2; 250/484.2; 250/486.1; 250/484.4
[58] Field of Search .................................. 430/139, 495, 430/944; 428/690; 250/330, 475.2, 484.2, 486.1, 484.4

[56] References Cited

U.S. PATENT DOCUMENTS

| | | | |
|---|---|---|---|
| 2,482,813 | 9/1949 | Urbach | 250/65 |
| 4,752,557 | 6/1988 | Tsuchino et al. | 250/484.4 |
| 5,006,366 | 4/1991 | Lindmayer | 427/71 |
| 5,028,509 | 7/1991 | Shimada et al. | 430/139 |
| 5,065,023 | 11/1991 | Lindmayer | 250/330 |
| 5,208,459 | 5/1993 | Morrone et al. | 250/484.4 |
| 5,233,183 | 8/1993 | Field | 250/214 |
| 5,245,623 | 9/1993 | McFarlane | 372/69 |

FOREIGN PATENT DOCUMENTS

| | | | |
|---|---|---|---|
| 2192035 | 8/1987 | Japan | 428/690 |
| 2129600 | 5/1990 | Japan | 250/484.4 |

OTHER PUBLICATIONS

"Preparation and Characteristics of Solid Luminescent Materials", The Division of Electron Optics of the American Physical Society, Oct. 24–16, 1946, Chapters 6, 16, 19 and 20.

Primary Examiner—Lee C. Wright

[57] ABSTRACT

The present invention is a composition for use in constructing a photosensitive film for recording color images. The preferred composition includes first, second, and third particle types. Each particle type comprises a crystalline base material having a trap dopant and a color dopant deposited therein. Each of the color dopants has a different activation energy for releasing electrons into the conduction/communication band of the crystalline base material. This results in a different spectral sensitivity for each dopant, and, hence for each particle type. In addition, each of the trap dopants has a different activation energy for releasing trapped electrons into the conduction/communication band of the crystalline base material. This enables the recorded color image to be read out one color at a time, which avoids color distortion.

The invention also provides a photosensitive film for recording a color image. The film comprises a backing material having a plurality of depressions therein. The depressions are filled with a photosensitive material that includes first, second, and third particle types. Each particle type comprises a crystalline base material doped with atoms of a trap dopant and a color dopant. Each color dopant has a different spectral sensitivity, and each trap dopant has a different activation energy for releasing trapped electrons into the conduction/communication band of the crystalline base material.

8 Claims, 3 Drawing Sheets

PHOSPHOR FILM COMPOSITION FOR USE IN IMAGE CAPTURE

FIELD OF THE INVENTION

The present invention relates to photography, and more particularly, to a solid state alternative to photographic film.

BACKGROUND OF THE INVENTION

Conventional photography is based on the exposure of a film coated with a light sensitive emulsion. While this system has been highly refined over the years, it has several problems. First, film based systems are environmentally objectionable. The systems involve noxious chemicals such as silver and chemical developers whose disposal in an environmentally acceptable manner is becoming increasingly more costly.

Second, the film cannot be reused. Most photographers take several pictures for each picture that is actually kept. This leads to large numbers of negatives that are thrown away. In addition to the cost of the unused negatives, this practice further aggravates the above mentioned disposal problems.

Third, film has a finite storage life. This increases the cost of photography requiring refrigerated storage and/or replacement for film that has passed its usable life.

Fourth, the dynamic range of film is less than adequate for many applications. Even black and white film has a gray scale of only 2.5–3 orders of magnitude. Color film is even more limited. In many applications, the range of intensities that must be recorded greatly exceeds this dynamic range. In such situations, at least some portion of the photograph must be over or under exposed.

Finally, correction of artifacts in photographs is difficult in film based systems. Altering the color of limited regions of a negative is all but impossible. Hence, artifacts such as "red eyes" in portraits taken with flash cameras must be handled by using special camera arrangements or by touching-up the prints. The latter approach requires talents not normally possessed by the average photographer.

These disadvantages together with the increased availability of low-cost computing systems have generated interest in solid state imaging systems such as CCD cameras and the like. Such cameras store their images on computer readable media such as magnetic disks. Since the image is computer readable, the image may be altered with the aid of a conventional computer workstation. Furthermore, these systems are environmentally superior to film in that they do not use noxious chemicals and the storage medium is reusable. Finally, solid state systems can have significantly more dynamic range than conventional film.

Unfortunately, solid state cameras having resolutions equivalent to the resolution available with photographic film are far too expensive for use by the average camera user. These systems are currently priced at 100 times the cost of an inexpensive camera. In addition, the user who is not computer literate has difficulty in having his or her images converted to conventional photographic prints.

Accordingly, there has been some interest in developing an alternative to film. Ideally, this alternative can be used in a conventional camera in place of conventional photographic film. For example, U.S. Pat. No. 5,065,023 to Lindmayer describes a material that utilizes electron trapping to store an image. An image projected on the surface of this material causes electrons to be elevated into the conduction band of the solid state material. The material is doped to have electron traps. The elevated electrons are trapped in spatially nearby traps. The density distribution of the trapped electrons in the material reflects the light intensity distribution of the incident image. This latent image is then read out electro-optically by scanning the material with an infra-red beam that releases the electrons from the traps and produces visible light when the electrons re-enter their original energy states. The visible light generated by the recombination can be measured and recorded to reveal the original image.

To generate the equivalent of color film, the system taught by Lindmayer utilizes a three layer structure. Each layer consists of a solid state material having two dopants. The first dopant determines the color sensitivity of the layer, i.e., the color of light that will lift an electron into the conduction band of the crystal. The second dopant, which is the same for all layers, determines the energy level of the electron trap. The second dopant determines the wavelength of the light to be used in interrogating the material.

When the three layer structure is scanned with an infra-red beam, each layer emits light of a different color with an intensity that depends on the prior exposure of the film to light in a wavelength range determined by the first dopants. In general, the light emitted on scanning will be at different wavelengths than the incident light to which the first dopants were sensitive; however, a correct color image can be generated from calibration data and a knowledge of the dopants.

The system taught by Lindmayer has several drawbacks. First, the system uses a multi-layer structure. To provide spatial resolution and spectral sensitivity that approximates that of conventional film, the material must be deposited on a non-flat surface. The preferred surface may be viewed as being densely covered with optically isolated "pits" that are filled with the light sensitive material. The width of the pits determines the spatial resolution of the film, since they confine scatter from the light sensitive material to within each pixel. The depth of the pits relates to the quantum efficiency of the film.

There is no practical method for providing a three layer structure in such pits in which the layers are uniform in the amount of material in each layer. If the material quantities are not controlled, color and sensitivity distortions result.

Second, the system taught by Lindmayer requires three deposition steps to generate the three layers. This increases the cost of producing the film.

Finally, all of the colors in the film alternative taught by Lindmayer must be read out all at once. Since the system taught therein uses the same dopant for all layers, the infra-red scanning beam triggers recombination in all of the layers. Emission due to read-out recombination from one band may fall in the color sensitive range of another band, which results in color distortion. While this artifact may be corrected, the correction requires computations that increase the cost of processing the film.

In addition, the scanner used to readout the film must have three sets of photodetectors to accommodate the simultaneous readout. This increases the cost of the scanner.

Broadly, it is the object of the present invention to provide an improved alternative to photographic film.

It is a further object of the present invention to provide a color film alternative that may be applied as a single layer.

It is a still further object of the present invention to provide a color film alternative in which the intensities of the various colors can be read-out independently.

These and other objects of the present invention will become apparent to those skilled in the art from the following detailed description of the invention and the accompanying drawings.

SUMMARY OF THE INVENTION

The present invention is a composition for use in constructing a photosensitive film for recording a color image. The preferred composition comprises first, second, and third particle types. Each particle type comprises a crystalline base material having a trap dopant and a color dopant deposited therein. Each of the color dopants has a different activation energy for releasing electrons into the conduction/ communication band of the crystalline base material. This results in a different spectral sensitivity for each dopant, and, hence, for each particle type. In addition, each of the trap dopants has a different activation energy for releasing trapped electrons into the conduction/communication band of the crystalline base material. The invention also provides a photosensitive film for recording a color image. The film comprises a backing material having a plurality of depressions therein. The depressions are filled with a photosensitive material that includes first, second, and third particle types. Each particle type comprises a crystalline base material doped with atoms of a trap dopant and a color dopant. Each color dopant has a different spectral sensitivity, and each trap dopant has a different activation energy for releasing trapped electrons into the conduction/communication band of the crystalline base material.

DETAILED DESCRIPTION OF THE INVENTION

The present invention comprises a phosphor for use in construction of a film that may be utilized in a conventional camera as a replacement for conventional color photographic film. As will be explained in more detail below, this replacement film stores an image by trapping electrons. The trapped electrons leave electron vacancies. The trapped electrons may be released by exposing the film to infra-red or visible light. Upon release, the trapped electrons enter a local electron vacancy and generate light of a wavelength determined by the vacancy. Assuming that the released electrons return to a site of the same chemical type as that from which the electrons were displaced, the image stored therein may be read-out. The light generated during readout is used to generate a photographic image that may be stored electronically or used to make conventional photographic prints. The readout is accomplished by scanning an exposed film with an infra-red light beam and measuring the light released in response to the light beam.

Figure 1:
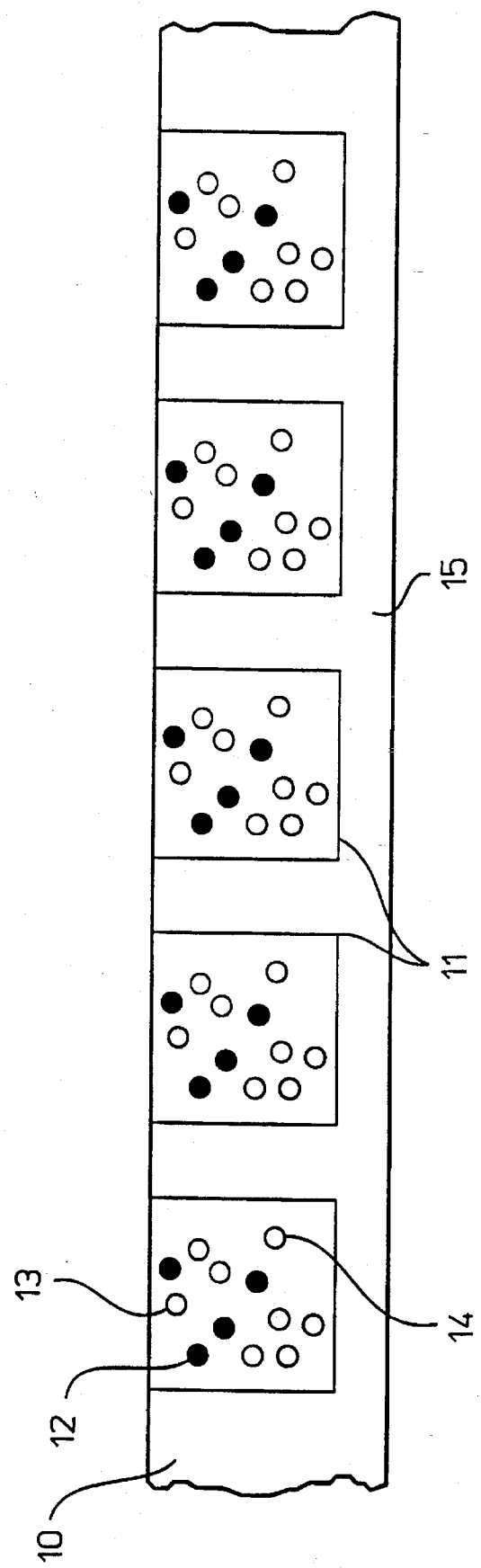
FIG. 1 is a cross-sectional view of a photographic film replacement media 10 utilizing a phosphor composition according to the present invention.

The present invention may be more easily understood with reference to FIG. 1 which is a cross-sectional view of a photographic film replacement medium 10 utilizing a phosphor composition according to the present invention. The phosphor is preferably deposited into depressions 11 in a film 15. The phosphor is preferably mixed with an epoxy binder or equivalent material which is then applied to film 15. The phosphor includes three types of particles 12–14. However, the particles may be applied to the pits without a binder. For example, a mixture of the particles may be pressed into the pits and covered with a transparent layer. Each type of particle comprises a small crystal that is sensitized so as to release electrons into the conduction/ communication band in response to a different range of visible wavelengths than the other types of particles. To provide color image recording in which the full range of colors is available, at least three different types of particles are needed, with their spectral sensitivities appropriately spaced over the visible wavelength range in a way that allows the color reproduction of the original image. However, it will be apparent to those skilled in the art from the following discussion that systems utilizing more than three types of particles may be advantageously utilized.

A backing material having depressions therein is preferred because the depressions prevent light from propagating parallel to the surface of the film. Such propagation during either image exposure or readout reduces the resolution of the film. An image storing phosphor having such depressions is described in co-pending U.S. patent application Ser. No. 08/287,433.

Figure 2:
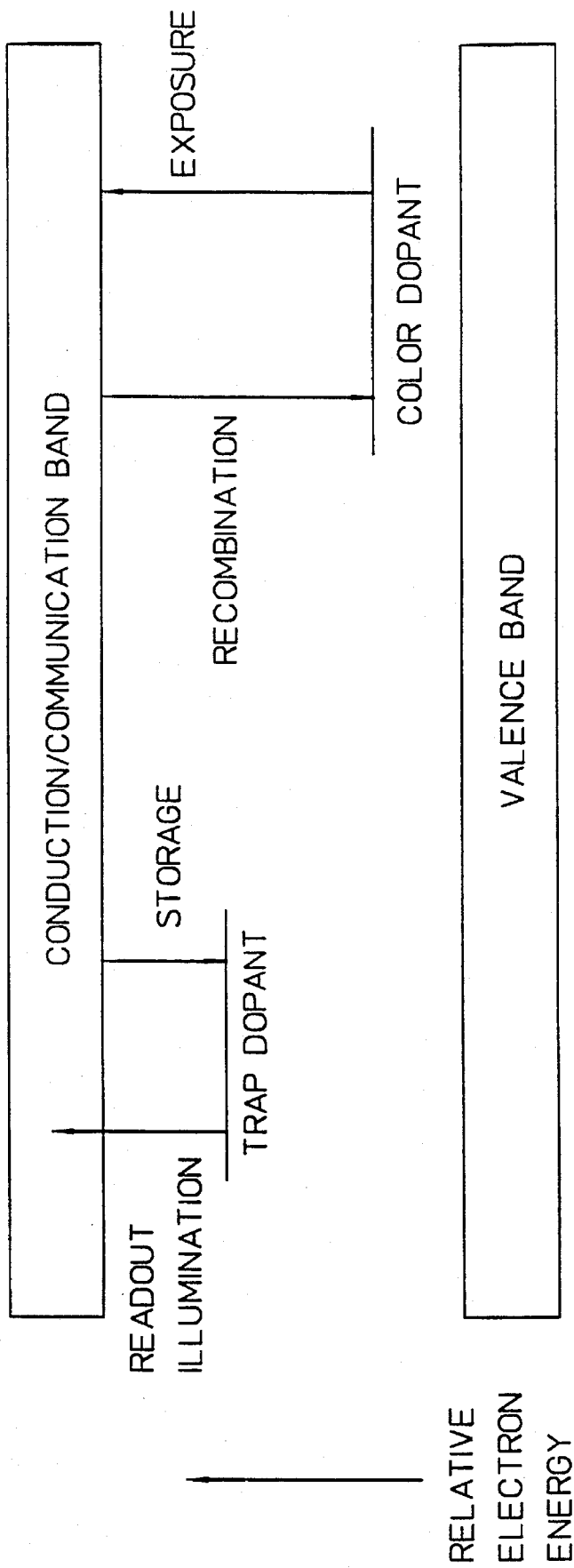
FIG. 2 is an energy level diagram for a phosphor particle according to the present invention.

The various types of phosphor particles are constructed by doping a base material with two dopants. The first dopant determines the sensitivity of the phosphor as a function of the wavelength of the light incident thereon. The second dopant determines the wavelength of the light that is to be used to read out an image stored in the film. Refer now to FIG. 2 which is an energy level diagram for a phosphor particle according to the present invention. The first dopant will be referred to as the color dopant in the following discussion. Upon exposure to light from an image, electrons are lifted into the conduction band of the crystal and diffuse to a site having the second dopant, referred to as the trap dopant in the following discussion. The sensitivity of the color dopant as function of incident light wavelength is determined by the particular dopant. Dopants that may be utilized to provide sensitivities in a number of wavelength ranges will be discussed in more detail below.

It should be noted that more than one color dopant may be used in each phosphor particle. It has been found experimentally that the inclusion of a second color dopant in a particle can lead to increased sensitivity.

In general, the trap dopants are chosen to have an energy level that is closer to the conduction band than any of the color dopants. Thus, a trap may be read out without exciting any of the color dopant sites. When the trapped electron is released by exposing the particle to light having the appropriate wavelength, the released electron recombines with an electron vacancy at one of the color dopant sites and generates a photon having a wavelength characteristic of the color dopant used.

Each particle type is responsible for recording a different color of light. As discussed above, each particle comprises a small crystal of a base material which has been doped with a color dopant and a trap dopant. Exemplary color dopants are Cu, Ag, Mn, O, Pb, Bi, Ce, Eu, Pr, Sm, Tb, Ho, Er, and Tm. Exemplary trap dopants are, Sm, Bi, Sn, Fe, V, Ni, Pb, and Ag. Exemplary base materials are MgS, CaS, SrS, BaS, and ZnS and their mixtures such as (Ca, Sr)S. Other dopants and base materials, such as the selenides will be apparent to those skilled in the art.

CaS doped with Eu as a color dopant and Sm as the trap dopant provides sensitivity to white light. ZnS doped with Cu as a color dopant and Pb as a trap dopant provides sensitivity to blue light as does: CaS:Cu, SrS:Cu, BaS:Ag, CaS:Bi, SrS:Bi. CaS with Mn as the color dopant and Sm as the trap dopant provides sensitivity to green light as does BaS:Mn, BaS:Cu, BaS:Bi. Yellow/orange sensitivity is provided by MgS:Eu, CaS:Eu, SrS:Eu. The trap dopant is not specified since it does not influence the spectral sensitivity. The concentration of the different dopants is maximized to give maximum sensitivity to the incident light and is in the atomic % range.

In one embodiment of the present invention, each type of particle has a different trap dopant as well as a different color dopant. This arrangement allows the image to be read out one color at a time. If all of the particles utilize the same trap dopant, then the readout beam stimulates all particles. The various intensities at the three colors must be determined simultaneously by observing the readout light intensity as a function of wavelength. It should be noted that the recombination spectra of one type of particle may overlap with the sensitivity spectra of a different type of particle, thus charging the second type of particle by the readout emission of the first type. This results in color distortion, therefore, each pixel's data must be corrected for the overlap between the existing recombination and sensitivity spectra. This computation increases the cost of the system.

If, on the other hand, each particle type has a different trap dopant, each type of particle can be readout separately. In this system, the particles having the trap dopant requiring the longest wavelength is read out first. Then the particles with the next longest readout wavelength are then read out, and so on. In this case, a single readout detector may be utilized and the above mentioned correction is no longer needed.

Figure 3:
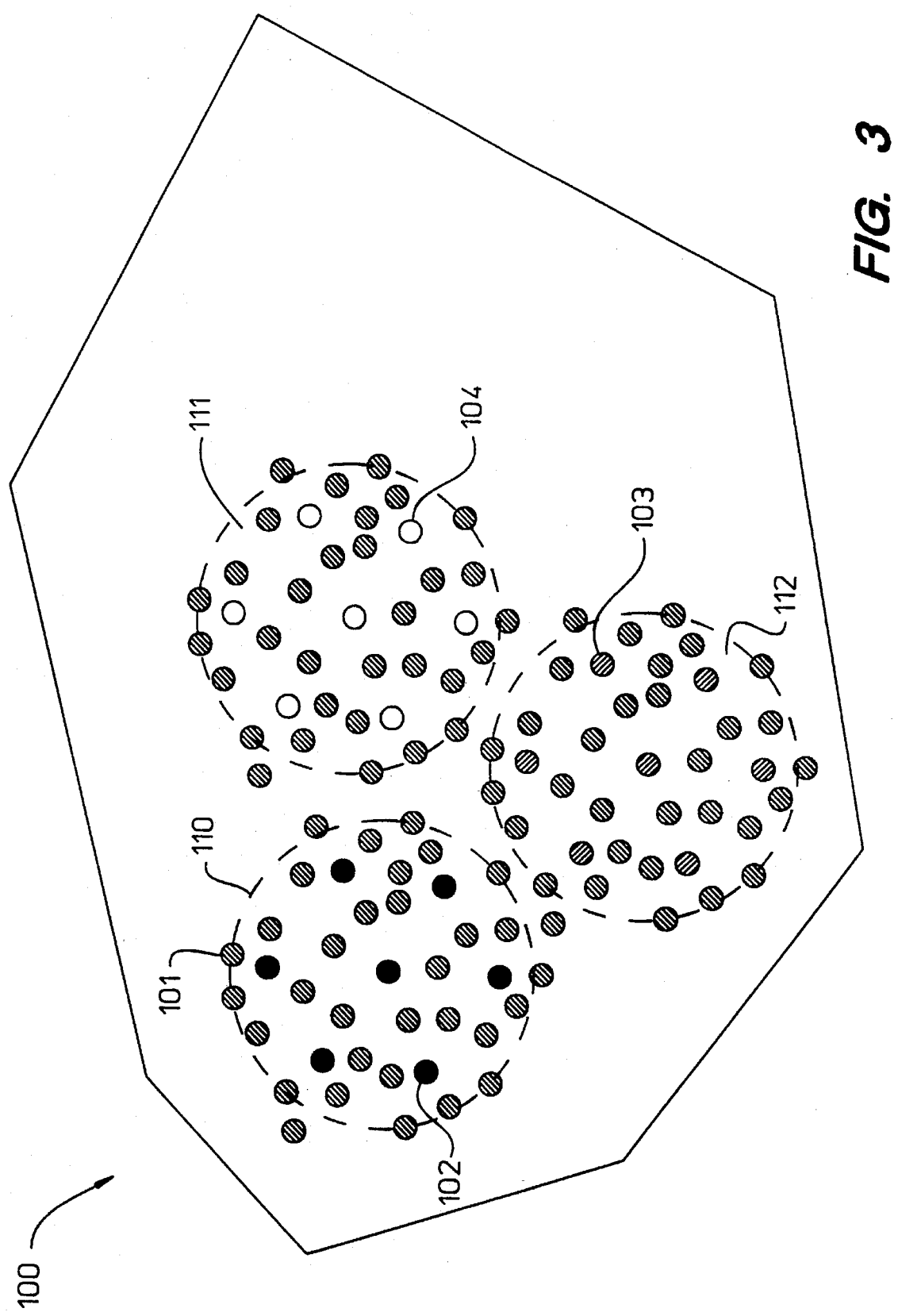
FIGS. 3 is a highly magnified section of a thin film 100 having the various dopant atoms deposited thereon.

The above-described embodiments of the present invention were constructed by applying a material having three types of particles therein to a backing material. Alternatively, a film replacement according to the present invention may be constructed by generating a thin film of the base crystal material on a backing and then doping the thin film using ion implantation techniques to provide the various dopants. Refer now to FIG. 3 which is a highly magnified section of a thin film 100 having the various dopant atoms deposited thereon. In the simplest embodiment of this type, the same trap dopant is utilized for each color receptor. Exemplary trap sites are indicated by the disks having the shading of the disk shown at 101. The color dopants are applied by implanting the three different types of color dopants. Exemplary color dopant sites are indicated by the disks having the shading of the disks shown at 102–104, respectively. The density of traps and color sites must be such that an electron leaving a color site will encounter an empty trap within a distance consistent with the desired spatial resolution of the film. Similarly, an electron displaced from a trap must return to a site having the same color dopant as that from which it was originally released within an acceptable distance from the original dopant site. This set of conditions can be satisfied by an arrangement in which there are a large number of trap sites around each dopant site and the color dopant sites are clustered together for each type of color dopant. In essence, the implant pattern would duplicate the individual "particles" described above within the common base thin film. Clusters representing individual "particles" are shown at 110–112.

The film thickness is mainly determined by the thickness of the layer which contains the sensitive material. This layer thickness is given by the lower of the absorption length of visible light in the sensitive material and the maximum practicable layer thickness in terms of bending and making a replacement film.

Various modifications to the present invention will become apparent to those skilled in the art from the foregoing description and accompanying drawings. Accordingly, the present invention is to be limited solely by the scope of the following claims.

What is claimed is:

1. A composition for use in constructing a photosensitive film for recording an image, said composition comprising first, second, and third particle types, each said particle type comprising a crystalline base material having a trap dopant and a color dopant deposited therein, each of said color dopants having a different spectral sensitivity, wherein each of said trap dopants has a different activation energy for releasing electrons traps therein into the conduction band of said crystalline base material.

2. The composition of claim 1 wherein at least one of said color dopants is chosen from the group consisting of Cu, Ag, Mn, O, Pb, Bi, Ce, Eu, Pr, Sm, Tb, Ho, Er, and Tm.

3. The composition of claim 1 wherein at least one of said trap dopants is chosen from the group consisting of Sm, Bi, Sn, Fe, V, Ni, Pb, and Ag.

4. The composition of claim 1 wherein said base material is chosen from the group consisting of MgS, CaS, SrS, BaS, ZnS, and their mixtures.

5. A photosensitive film, comprising a backing material having a plurality of depressions therein, said depressions being filled with a photosensitive material including first, second, and third particle types, each said particle type comprising a crystalline base material doped with atoms of a trap dopant and a color dopant, each of said color dopants having a different spectral sensitivity, and each of said trap dopants having a different activation energy for releasing electrons traps therein into the conduction band of said crystalline base material.

6. The photosensitive film of claim 5, wherein at least one of said color dopants is chosen from the group consisting of Cu, Ag, Mn, O, Pb, Bi, Ce, Eu, Pr, Sm, Tb, Ho, Er, and Tm.

7. The photosensitive film of claim 5, wherein at least one of said trap dopants is chosen from the group consisting of Sm, Bi, Sn, Fe, V, Ni, Pb, and Ag.

8. The photosensitive film of claim 5, wherein said crystalline base material is chosen from the group consisting of MgS, CaS, SrS, BaS, ZnS, and their mixtures.

* * * * *